M. U. BERNHEIM.
CONVEYER.
APPLICATION FILED AUG. 4, 1911.

1,280,950.

Patented Oct. 8, 1918.
2 SHEETS—SHEET 1.

Witnesses

Inventor
Morris U. Bernheim
By C. J. Stockman
Attorney

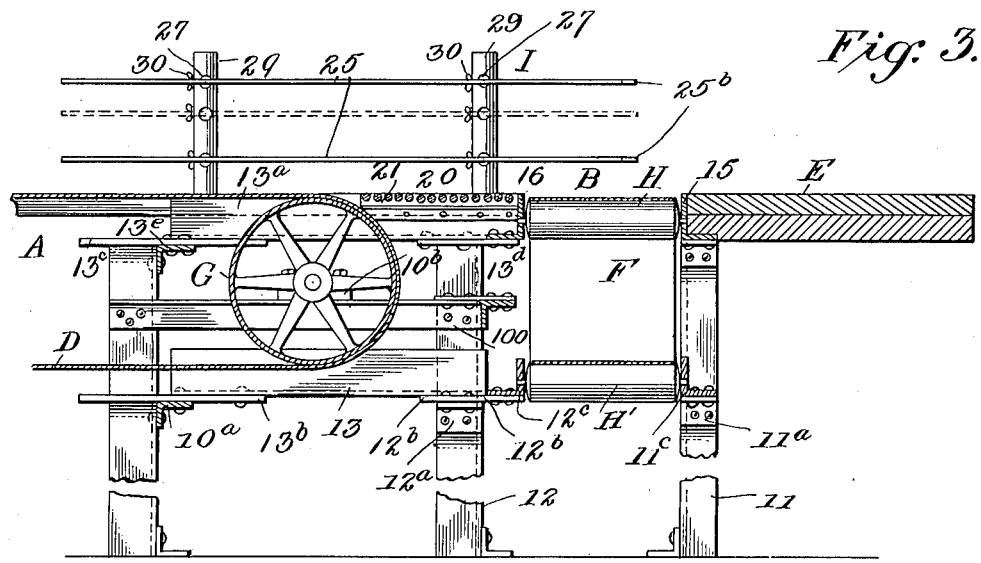
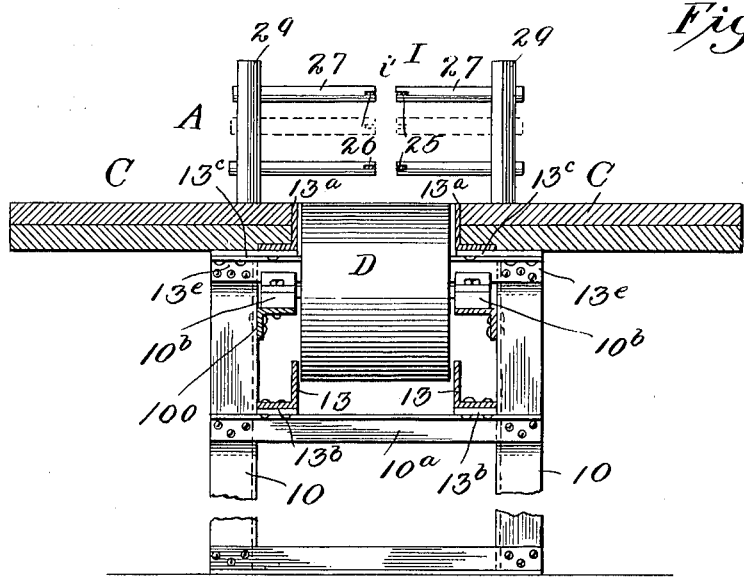

UNITED STATES PATENT OFFICE.

MORRIS U. BERNHEIM, OF LOUISVILLE, KENTUCKY, ASSIGNOR TO THE ALVEY-FERGUSON COMPANY, OF OAKLEY, CINCINNATI, OHIO, A CORPORATION OF OHIO.

CONVEYER.

1,280,950.  Specification of Letters Patent.  Patented Oct. 8, 1918.

Application filed August 4, 1911. Serial No. 642,262.

*To all whom it may concern:*

Be it known that I, MORRIS U. BERNHEIM, a citizen of the United States, residing at Louisville, in the county of Jefferson and State of Kentucky, have invented new and useful Improvements in Conveyers, of which the following is a specification.

This invention has reference to conveying mechanisms, and consists of the novel features and combinations hereinafter described and illustrated in the accompanying drawings.

In its illustrated embodiment it has particular reference to a combination of belt tables or belt conveyers, arranged at right angles with each other, and having at their junction a guiding means which is so associated with the belts that it will receive bottles or like packages from one belt, aline them one after another at about the longitudinal center of said belt and guide them to about the longitudinal center of the other belt. The guiding means herein referred to may be otherwise employed than as a means for guiding bottles, or other packages of more or less similar nature, from one traveling belt to another traveling belt arranged at right angles to the first-mentioned belt. It may, for example, be employed with other styles of conveyers than belt conveyers, and, further, it may be employed at the junction of a conveyer with a table or the like. In short this guiding means forms a very important part of the present invention and while its most useful employment is in a bottle-conveying system comprising endless belts arranged at an angle with each other, it is not intended to restrict its use to such employment, although a system comprising conveyers and a guiding means of the present character has such practical advantages that it has been made the subject of some claims more or less restricted thereto.

The guiding means illustrated in the accompanying drawings is particularly constructed to make it adjustable to suit various sizes of packages without destroying its proper coöperative relation with the conveyer or conveyers with which it is associated, and this forms a further feature of the present invention.

One of the conveyers has a bed of special form which contributes to the advantages possessed by the present invention.

It is deemed to be unnecessary to illustrate or describe the various embodiments of the present invention considered to be comprehended within the spirit and scope of the invention as defined by the subjoined claims. I have, however, selected what I regard to be the best form and construction of guiding means, and the most advantageous form and arrangement of elements coöperating therewith to conduct bottles or like packages from one place to another and for changing the direction of travel of the packages, and have particularly shown this embodiment of the invention and will direct the following description thereto, without, however, in anywise thereby intending to restrict the invention to this particular embodiment.

In the drawings referred to, wherein like characters of reference denote like parts in the several views, Figure 1 is a plan view of the junction of two belt tables, or belt conveyers, arranged at right angles with each other and embodying the present improvements.

Fig. 3 is a longitudinal section on the line 3—3 of Fig. 1.

Fig. 4 is a transverse section on the line 4—4 of Fig. 1.

Figure 1:
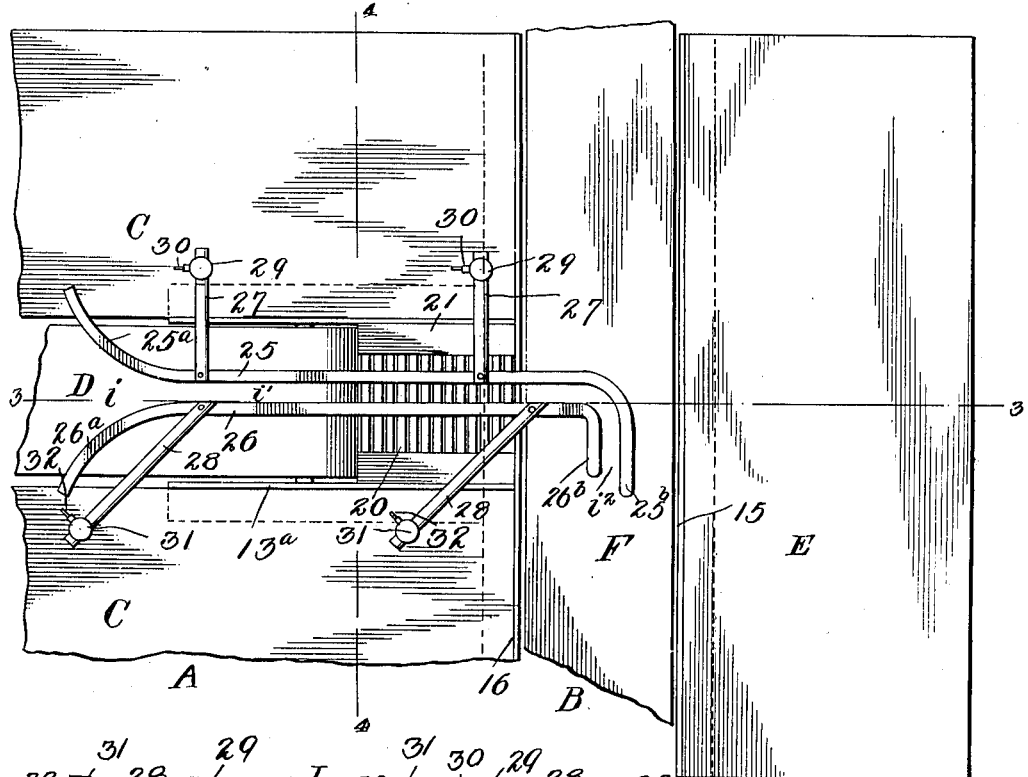

A designates one conveyer and B the other. These conveyers may be of any suitable length and may desirably be employed in connection with the various operations incidental to the packaging of liquids in bottles, for example, being in such case employed as means for transferring the bottles from one operative to another, each operative lifting the bottle from the conveyer, performing his or her work thereon and then returning the bottle to the conveyer by which it is moved to the next operative and so on until the entire sequence of operations, including if desired the filling, closing, labeling and wrapping of the bottles, is completed. The exigencies of space in many bottling establishments are such as to make it advantageous to employ a plurality of conveyers arranged at an angle with each other for serving the many operatives who can usefully be employed in large establishments in connection with the various operations incidental to the packaging, including the labeling, of bottles, or for serving a number of operatives who perform a part only of such operations, labeling, for example. It, therefore, becomes important to serve the demand created by such conditions, by a practical means which will automatically convey the bottles from one operative to another, and accomplish their safe transfer from one traveling bed or way to another arranged at an angle therewith.

As hereinbefore stated the illustrated embodiment of the invention has particular reference to a system such as has just been referred to, although important features of the invention may be otherwise embodied, as already stated.

The conveyer A comprises a suitable frame which supports a work table or bench C at one or both sides of an endless traveling apron or belt D. The belt D runs over pulleys or other appropriate devices, suitably supported by the frame, and the power for driving the belt is transmitted to the latter through one of said pulleys, the other being an idler. The packages to be conveyed are deposited on this belt and are carried by the latter, the belt thereby forming a bed or way. It is customary in this type of conveyers to provide a supporting surface for the belt, arranged beneath and in contact with the latter but as said supporting surface forms no part of the present invention it is considered to be unnecessary to illustrate or to describe the same particularly herein, though it is to be understood that it may be employed or omitted as required. The means for driving the belt D also forms no part of the present invention and hence are not herein shown.

The conveyer B also comprises a suitable frame which supports a work table or bench E at one or both sides of an endless traveling apron or belt F. This belt, like the belt D, runs over pulleys or other appropriate devices and may be supported throughout its length by a suitable means beneath it. The belt F forms the bed or way of the conveyer B and preferably is driven separately from the belt D.

While, as stated it is considered to be unnecessary to show the driving mechanisms, yet mention may be made of the fact that the pulley G is preferably the driving pulley of the belt D and that a similar pulley (not shown) is arranged at the far end of the belt F for driving the latter: idler pulleys, not shown, being preferably employed at the other ends of the belts, with spaced freely-rotatable rollers H, H' to support the belts between the pulleys.

A very desirable frame construction at the junction of the two conveyers is illustrated. This comprises three pairs of angle-iron standards, each member of one pair being marked 10, each member of another pair being marked 11 and each member of the third pair being marked 12. The members 10 are arranged at opposite sides of the belt D in advance of the discharging end of the latter and are connected with each other by a transverse member $10^a$ and are connected with the members 12 by longitudinal angle irons 100 which support bearings $10^b$ for the shaft of the pulley G. The members 11 are arranged at the side of the belt F remote from the discharge end of the belt D, and they are in line with the members 10, respectively. The members 12 are arranged between and in line with the members 10 and 11 and are common to both conveyers. Each member 12 is provided with an angle plate $12^a$ which supports a plate $12^b$ and these plates $12^b$ in turn support angle bars $12^c$ which provide bearings for one end of a line of rollers H'; bearings $11^c$ for the other ends of said rollers being carried by angle plates $11^a$ on the members 11. Angles 13 extending longitudinally of the frame between the members 10 and 12 have opposite ends of their flanges secured to the plates $12^b$ and to corresponding plates $13^b$, the plates $13^b$ being supported by angles $10^a$. The vertical members for the angles 13 form guides for the returning run of the belt D, similar guides $13^a$ being employed for the working run of the belt, if desired. The girders $13^a$ have plates $13^c$ and $13^d$, the former of which are supported by an angle $13^a$ which extends across the frame between the members 10, while the plates $13^d$ rest on the members 12. The members $13^a$ connect the members 10 and 12 with each other and also form seats for the work tables C of the conveyer A, and the members 11 are similarly connected by a member, as 15, which forms a seat for the work table E of the conveyer B. It will be understood that a line of members 10 extends along each side of the conveyer A and that the work tables C may be of any desired length with reference to the belt D. It will also be understood that a line of members 11 extends along the side of the belt F and a similar line of members 12 extends along the other side of said belt and may, except where the conveyer B is tapped by the conveyer A, support a work table, not shown, the work table E and the one at the other side of the belt F being of any desired length with reference to said belt. The upper rollers H, of which there is preferably employed a line to form a supporting surface for the belt F, are journaled at one end in the angle bar 15 and at the other end in an angle bar 16, the latter being attached to the plates 13$^d$ and carried by the posts 12. It will be understood that a similar line of rollers H' may be employed for the returning run of the belt, and also that similar rollers may be employed for both the working and returning runs of the belt D, whereby the belts will operate with a minimum of friction.

Attention is called to the fact that the pulley G occupies such relation to the belt F that a space will be provided between the end of the belt D and the edge of the belt F. Within this space there is mounted a series of rollers 20 which form that portion of the bed or way of the conveyer A located between the discharging portion of the belt D and the receiving part of the belt F. These rollers are set appropriate distance apart from center to center and preferably are of the freely rotatable kind. As the present embodiment of the invention is more particularly intended for the conveyance of bottles in upright position, the rollers 20 are shown as being set quite closely together, but it will be apparent that their relative location, and also their number, will depend in a large measure upon the particular character of packages which are to be conveyed. They are preferably carried by a frame 21 which is suitably secured to the frame of the conveyer, being shown as carried by the posts 12.

The guiding means hereinbefore referred to is designated I as a whole. It is arranged at the junction of the belts D and F and extends partway along the length of the former and partway across the latter, and also over the rollers 20. It has two sides and is formed to provide an inlet section or mouth, designated $i$, whose sides extend convergently toward the center of the way from the opposite longitudinal sides of the way, an intermediate section or passageway, marked $i'$, which is arranged over the center of the way and whose diameter is approximately the same as that of the packages which are being conveyed, so as to cause the packages to pass therethrough one behind the next. This section $i'$ extends for a suitable distance longitudinally over the belt D and over the rollers 20, and also extends partway across the belt F and terminates in a lateral exit or discharging section $i^2$ which is arranged longitudinally over the belt F and at right angles to the section $i'$.

It will be apparent that packages moving along with the belt D will be carried thereby into the inlet section or mouth $i$ and by the latter will be guided toward the transverse center of the belt and into the section $i'$. Traversing said section $i'$ the packages will finally be delivered onto the belt F through the exit section $i^2$. It will also be apparent that the rollers 20 contribute to the safe and easy delivery of the packages from the belt D to the belt F, the packages being moved gently across said rollers and deposited without shock on the belt F, each by the pressure of the line back of it. It will also be noted that the packages are delivered to the belt F one after another and in an alined position at about the transverse center of the latter, whether or not they are alined on the belt D when they reach the mouth of the guide.

In order to adapt the guide to different diameters of packages, it is adjustable to vary the width of the passageway through it. It is also adjustable as to height to accommodate packages of different heights. A very advantageous detail construction of guide will now be described.

25 and 26 designate members which form the respective sides thereof. There may be any desired number of members 25 arranged one over another to form one side of the passageway and similarly any suitable number of members 26 arranged one over another to form the other side of the passageway. Two members for each side usually will be ample for bottle conveyers. Each member 25 has one end, 25$^a$, bent outward to form one side of the mouth $i$ of the passageway and its other end bent laterally, as shown at 25$^b$ toward and to a place beyond the vertical plane of the other side of the passageway to form one side of the exit $i^2$ of said passageway. Each member 26 has one end 26$^a$, bent reversely to the end 25$^a$ of the other member to form the other side of the expanded mouth of the passageway, while its opposite end 26$^b$ is bent correspondingly to the adjacent end 25$^b$ and extends substantially parallel therewith. All the bends are gradual ones, whereby the travel of the packages through the passageway is not stopped thereby.

Each member 25 is provided with spaced laterally extending arms 27, while each member 26 is provided with spaced diagonally arranged arms 28. The arms 27 are slidably mounted on supporting posts, 29, preferably in apertures formed in the latter, whereby the members 25 are adjustable bodily relatively to the members 26, and said arms are held in adjusted position by set screws 30. The diagonally arranged arms 28 are similarly slidably engaged with supporting posts 31 in order that the members 26 may be adjusted relatively to the members 25, and is held in adjusted position by set screws 32. It will be noted that as the adjustment of the members 26 is in a line diagonal to the longitudinal axis of the portion $i'$ of the passageway the adjustment of said members varies the diameter of the exit $i^2$, whose longitudinal axis is at right angles to that of said portion $i'$, as well as varies the diameter of the latter portion, without destroying the parellelism of the parts. In short, this mode of adjustment causes the diameter of the passageway through the guide I to be varied uniformly throughout. The direction of adjustment of the member 25 obviously is at right angles to the longitudinal axis of the part $i'$ of the passageway.

Figure 2:
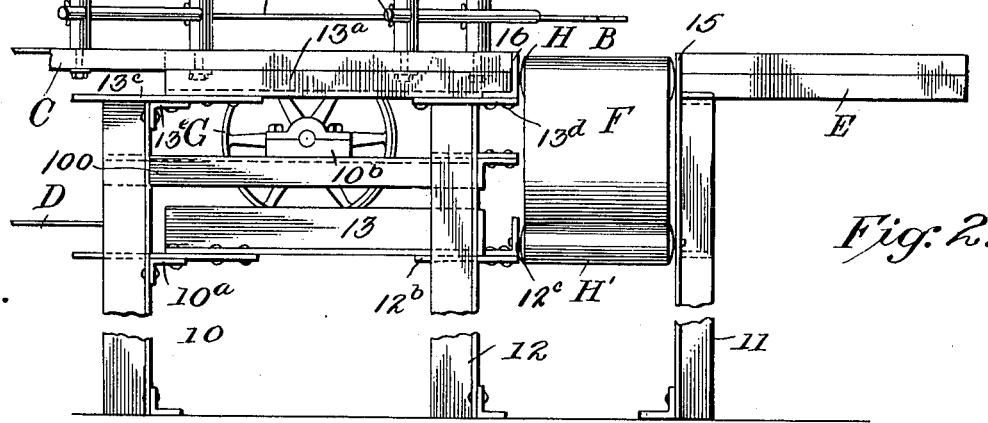
Fig. 2 is a side elevation of the same.

It will be apparent from the foregoing that provision is also made for variously regulating the height of the guide by providing a number of apertures in the posts 29 and 31 and placing the arms 27, 27 and 28, 28 in appropriate ones thereof, said arms being removable from the posts and adapted to any of the apertures. It is usually sufficient to have two members 25 and 26 for each side of the passageway and to provide each supporting post with three apertures. For a tall bottle the arms 27 and 28 may extend through the upper and lower apertures respectively of their supporting posts, as shown in full lines in Fig. 2, while for shorter bottles the upper members may be moved and their arms engaged with the intermediate apertures of their posts, as shown in dotted lines in said figure.

While in the system herein illustrated only two conveyers are shown it is apparent that if desired the conveyer B may be associated with a plurality of conveyers B arranged upon one side or upon opposite sides thereof, as preferred. It will be noted that the sides of the guide may be removed or slidably adjusted as desired so as to be entirely clear of the belt F, and hence if a plurality of belts D arranged at intervals along the length of the belt F are employed the guides of any of the same which would be in the path of packages on the belt F may be adjusted out of operative relation with said belt. It will also be apparent that while the exemplified system shows the conveyer B, the parts may be so arranged that the conveyer B will deliver to the conveyer A.

Having now described the invention what I believe to be new and desire to secure by Letters Patent, is:

1. A package conveyer comprising an approximately horizontal delivering endless traveling bed or way and an approximately horizontal receiving endless traveling bed or way, said beds or ways being arranged at an angle with each other and having their working surfaces disposed substantially in the same horizontal plane: combined with a package-guiding means having its mouth arranged over the delivering bed or way and its outlet over the receiving bed or way, the delivering bed or way extending from a place in advance of the mouth of the guiding means and terminating in advance of said outlet from the guiding means, the guiding means comprising side walls which extend convergently from the opposite longitudinal edges of the delivering bed or way, thence longitudinally of said bed or way in a substantially parallel relation with each other to a place which is over the receiving bed or way and thence laterally with respect to the delivering bed or way and longitudinally over the receiving bed or way, the distance between the walls of the longitudinally and laterally extending sections of the guiding means being substantially the same and such as to form longitudinal and lateral passageways whose width is less than the widths of the endless traveling beds or ways and approximately the same as that of the packages which are to be conducted therethrough.

2. A package conveyer, comprising a delivering endless traveling bed or way and a receiving endless traveling bed or way disposed at an angle to and spaced from each other, and a series of freely rotatable rollers forming a bed or way which spans the space between the discharging end of the delivering bed or way and the side of the receiving bed or way, combined with a guiding means having a mouth arranged over the delivering bed or way, an outlet arranged over the receiving bed or way and an intermediate portion arranged over said rollers, said guiding means comprising side walls which extend convergently from the opposite longitudinal edges of the delivering bed or way, thence longitudinally of said bed or way in a substantially parallel relation with each other and over the roller bed to a place which is over the receiving bed or way and thence laterally and partway along the receiving bed or way, the distance between the walls of the longitudinally and laterally extending sections of the guiding means being substantially the same and such as to form longitudinal and lateral passageways whose width is less than the width of the endless traveling bed or way and approximately the same as that of the packages which are to be conducted thereover.

3. A bottle conveyer comprising a pair of endless traveling belts disposed substantially at right angles to each other and in substantially the same horizontal plane, one of said belts constituting a delivering element and the other a receiving element combined with a guide having side walls, each of which includes a longitudinal section and a laterally extending end, the walls being so correlated with each other and with the endless belts as to provide a passage having two parts one of which extends longitudinally over the delivering belt and the other of which extends longitudinally over the receiving belt together with an intermediate portion which lies at an angle to both of said parts and guides the bottles from one to the other, said walls being spaced from each other a distance substantially equal to the width of the bottles which pass therebetween whereby said bottles are maintained in a single line during their travel.

4. A structure as recited in claim 3 in which a series of freely rotatable rollers are disposed between the end of the delivering belt and a side of the receiving belt.

5. A conveyer comprising an approximately horizontal traveling delivering bed or way and a receiving bed or way arranged adjacent to the end of the delivering bed or way and in substantially the horizontal plane thereof, combined with a guide having side walls relatively arranged to form a passage which extend longitudinally of the delivering bed or way and thence laterally and over the receiving bed or way, and means whereby one wall of the passage is adjustable throughout its length relatively to the other wall thereof in a direction angular with respect to both said parts of the passage to thereby uniformly vary the width of the passage.

6. A conveyer, comprising an approximately horizontal delivering endless traveling belt and an approximately horizontal receiving endless traveling belt, said belts being arranged at an angle to each other and having their working surfaces disposed substantially in the same horizontal plane; combined with a guide comprising side walls arranged to form a passage which has a part extending longitudinally over the delivering belt and partway across the receiving belt and thence laterally partway along the latter, means whereby one wall of the passage is adjustable relatively to the other wall in a direction which is angular with respect to both said parts of the passage and means whereby the other wall is adjustable relatively to the first wall in a direction which is at an angle to one of said parts of the passage only.

7. A package conveyer comprising an approximately horizontal guide including side walls relatively arranged to provide a passage having two parts arranged at an angle to each other, means by which packages are caused to travel through said passage and means whereby one wall of the passage is adjustable angularly with relation to both parts of the passage.

8. A package conveyer comprising an approximately horizontal guide including side walls relatively arranged to provide a passage having two parts arranged at an angle to each other, means by which packages are caused to travel through said passage, means whereby one wall of the passage is adjustable angularly with relation to both parts of the passage, and means whereby the other wall of the passage is adjustable at an angle to one part of the passage only.

9. A package conveyer having an approximately horizontal guide including side walls relatively arranged to provide a passage having two parts arranged at an angle to each other, diagonally arranged supporting arms connected to one of said walls, supporting arms extending from the other wall in a direction substantially at right angles therewith, supports upon which said arms are longitudinally adjustable and means for fixing the arms in adjusted position.

10. A package conveyer having an approximately horizontal guide including side walls which are relatively adjustable to vary the width of the passage formed between them, said walls being formed to provide a passage having a contracted mouth at one end and a laterally-extending exit at its other end, the means whereby the width of the passage may be adjusted comprising a member extending diagonally from one of said walls, and a supporting means to which said member is adjustably fixed.

11. A package conveyer having a guide comprising side walls each composed of a plurality of separate longitudinal members and supports to which said members are removably secured, said supports being adapted to hold said members at varying distances apart, whereby the height of the guide may be adjusted.

12. A package conveyer having a guide comprising side walls each composed of a plurality of separate longitudinal members and supports for said members, the latter having elements for connecting them to said supports, said elements being adjustable upon and removable from the supports whereby the diameter and height of the passageway may be varied.

13. A package conveyer having a guide comprising side walls each composed of a plurality of separate longitudinal members, each member having rods projecting therefrom, supports having means for supporting the rods at varying distances apart to permit the height of the passageway to be varied and said rods being longitudinally adjustable upon the supports to vary the diameter of the passageway.

14. A package conveyer having a guide comprising side walls each composed of a plurality of separate longitudinal members, each member formed of two parts extending at an angle with each other and means whereby said members are adjustably supported to form a passageway whose diameter may be uniformly varied throughout its length and whose height may be changed, said means comprising rods extending diagonally from each member of one wall, rods extending from each member of the other wall and at substantially right angles with a part of the latter, supports upon which said rods are removably and adjustably mounted and means for securing the rods in adjusted position upon said supports.

In testimony whereof I have hereunto set my hand in presence of two subscribing witnesses.

MORRIS U. BERNHEIM.

Witnesses:
  Roy R. Worrall,
  W. E. Gotthardt.